United States Patent [19]

Ito et al.

[11] Patent Number: 5,895,100
[45] Date of Patent: Apr. 20, 1999

[54] BRAKE APPARATUS FOR AN ELECTRIC VEHICLE TO MAXIMIZE REGENERATIVE ENERGY

[75] Inventors: Masashi Ito, Seto; Fumiaki Kawahata, Toyota; Masayasu Ohkubo, Okazaki; Kiyoharu Nakamura, Toyota; Akira Sakai, Toyota; Akihiro Otomo, Toyota, all of Japan

[73] Assignee: Toyota Jidosha Kabushiki Kaisha, Aichi-Ken, Japan

[21] Appl. No.: 08/791,451

[22] Filed: Jan. 27, 1997

[30] Foreign Application Priority Data

Jan. 29, 1996 [JP] Japan .................. 8-013345

[51] Int. Cl.[6] .................................. B60L 7/10
[52] U.S. Cl. ............... 303/152; 303/3; 303/112; 303/DIG. 3; 188/156; 188/158; 188/181 T
[58] Field of Search ........................ 303/152, 3, 112, 303/20, 15, 151, DIG. 1, DIG. 2, DIG. 3, DIG. 4, 198, 189, 188, 162; 318/139, 376; 180/65.4, 165, 65.1, 65.2; 188/156, 181 T, 158; 701/22, 81, 108

[56] References Cited

U.S. PATENT DOCUMENTS

| | | |
|---|---|---|
| 3,621,929 | 11/1971 | Oberthur . |
| 5,148,883 | 9/1992 | Tanaka et al. ............... 701/22 |
| 5,253,929 | 10/1993 | Ohori ........................... 303/3 |
| 5,294,191 | 3/1994 | Giorgetti et al. ............ 303/152 |
| 5,326,158 | 7/1994 | Ohori et al. ................. 303/15 |
| 5,358,317 | 10/1994 | Cikanek ....................... 303/3 |
| 5,378,053 | 1/1995 | Patient et al. ................ 303/152 |
| 5,399,000 | 3/1995 | Aoki et al. ................... 180/165 |
| 5,433,512 | 7/1995 | Aoki et al. ................... 303/152 |
| 5,450,324 | 9/1995 | Cikanek ....................... 303/3 |
| 5,542,754 | 8/1996 | Aoki et al. ................... 303/152 |
| 5,632,534 | 5/1997 | Knechtges .................... 303/152 |

FOREIGN PATENT DOCUMENTS

| | | |
|---|---|---|
| 1438812 | 2/1969 | Germany . |
| 1905641 | 8/1970 | Germany . |
| 4110638 | 10/1992 | Germany . |
| 4124496 | 1/1993 | Germany . |
| 7-205800 | 8/1995 | Japan . |

*Primary Examiner*—Douglas C. Butler
*Attorney, Agent, or Firm*—Kenyon & Kenyon

[57] ABSTRACT

A brake apparatus for an electric vehicle which maintains the regenerative energy generated in a traction motor of each of wheels to be at a maximum. A hydraulic pressure brake and a regenerative brake are provided in the same brake apparatus. The hydraulic pressure brake generates a brake torque by providing a hydraulic pressure to a wheel cylinder of each wheel of the vehicle. The regenerative brake generates a brake torque by regeneration in a traction motor for each wheel. The brake torque to be provided is calculated for each wheel. A maximum regenerative energy is calculated for each wheel. A hydraulic pressure calculating unit calculates a hydraulic pressure to be provided to the wheel cylinder of each wheel based on the brake torque and the maximum regenerative energy so that the regenerative energy generated by the traction motor of each wheel becomes a maximum. The hydraulic pressure calculated by the hydraulic pressure calculating unit is provided to the wheel cylinder of a corresponding wheel by a hydraulic pressure control valve which generates the hydraulic pressure by reducing a master cylinder pressure.

8 Claims, 5 Drawing Sheets

BRAKE APPARATUS FOR AN ELECTRIC VEHICLE TO MAXIMIZE REGENERATIVE ENERGY

BACKGROUND OF THE INVENTION

1. Field of the Invention

The present invention generally relates to a brake apparatus for a vehicle and, more particularly, to a brake apparatus suitable for an electric vehicle.

2. Description of the Related Art

In an electric vehicle, braking is performed normally by using both a hydraulic brake and a regenerative brake. In the hydraulic brake, a hydraulic pressure is provided to a wheel cylinder of each of the wheels so as to generate a brake torque in response to a braking operation by a driver. Whereas, in the regenerative brake, a brake torque is generated by a regeneration action obtained based on a reverse electromotive force generated in a traction motor which drives the drive wheels of a vehicle. The regenerative brake regenerates electric energy which is to be charged to a battery based on the reverse electromotive force generated by inertial rotation of the traction motor. The electric energy (hereinafter referred to as regenerative energy) regenerated by the regenerative brake varies in response to a regenerative brake torque. It is preferable to increase the regenerative energy so as to maintain a battery in a sufficiently charged state. Thus, in order to maximize the regenerative energy, it is desired to maximize the regenerative brake torque within a range in which the regenerative energy is acceptable for the battery. If the regenerative brake torque is not sufficient for the required brake torque determined by a braking operation performed by a driver, a hydraulic pressure which generates a brake torque corresponding to the shortage of the brake torque is provided to the wheel cylinder so as to achieve the required brake torque.

Japanese Laid-Open Patent Application No. 7-205800 discloses a brake apparatus for an electric vehicle having the above-mentioned function. In this brake apparatus, a hydraulic pressure control valve provides a proportionally reduced master cylinder pressure to both front wheels and rear wheels. That is, the hydraulic pressure control valve provides to each wheel cylinder a pressure corresponding to the difference between the maximum acceptable regenerative torque and the required brake torque.

The required brake torque for a vehicle and the maximum regenerative brake torque are not always equal between the right side wheels and the left side wheels. That is, for example, the required brake torque for the entire vehicle is distributed to each of the wheels as required wheel brake torque in response to a moving condition such as turning a curve or moving straight or when a load is applied to each of the wheels. Accordingly, the required wheel brake torque may differ wheel to wheel. Additionally, in a case where a traction motor is separately provided to each of the wheels, the maximum regenerative brake torque may also differ from wheel to wheel due to variation in the operational conditions of each of the traction motors. In such a case, the wheel cylinder pressure provided to each of the wheel cylinders must be separately controlled so as to provide the required wheel brake torque to each of the wheels in a state where the regenerative torque is to be maintained at a maximum.

However, the conventional brake apparatus provided in the above-mentioned electric vehicle has a single wheel cylinder for each of the front wheels and the rear wheels. Thus, the brake torque applied to the left wheels and right wheels cannot be controlled separately. Accordingly, in the conventional brake apparatus, a hydraulic pressure corresponding to a larger torque difference is applied to the wheel cylinder connected to both the left wheel and the right wheel in either the front side or the rear side so as to achieve the required brake torque on the side where the larger torque difference is generated. In this case, on the side where the required wheel brake torque is smaller, the regenerative brake torque must be reduced so that the total brake torque does not exceed the maximum allowable torque. Accordingly, in the conventional brake apparatus for the electric vehicle, there is a problem in that the regenerative energy cannot be maintained at the maximum.

SUMMARY OF THE INVENTION

It is a general object of the present invention to provide an improved and useful brake apparatus for an electric vehicle in which the above-mentioned problems are eliminated.

A more specific object of the present invention is to provide a brake apparatus for an electric vehicle which maintains the regenerative energy generated in a traction motor of each of wheels to be a maximum.

Another object of the present invention is to provide a brake apparatus for an electric vehicle in which a hydraulic pressure provided to each of wheel cylinders is separately controlled.

In order to achieve the above-mentioned objects, there is provided according to the present invention a brake apparatus for an electric vehicle which includes a hydraulic pressure brake and a regenerative brake, the hydraulic pressure brake generating a brake torque by providing a hydraulic pressure to a wheel cylinder of each wheel of the vehicle, the regenerative brake generating a brake torque by regeneration in a traction motor for the each wheel, the brake apparatus comprising:

a torque calculating unit calculating a brake torque to be provided to the each wheel;

a maximum regenerative energy calculating unit calculating a maximum regenerative energy generated by the traction motor for the each wheel; and a hydraulic pressure calculating unit calculating a hydraulic pressure to be provided to the wheel cylinder of the each wheel based on the brake torque and the maximum regenerative energy so that the regenerative energy generated by the traction motor for the each wheel becomes maximized.

According to the above-mentioned invention, the brake torque to be provided to each of the wheels is calculated for each of the wheels. The hydraulic pressure provided to each of the wheel cylinders is controlled based on the maximum allowable regenerative energy which can be generated by a corresponding one of the traction motors. Since the brake torque applied to each of the wheels is a sum of the brake torque generated by the hydraulic pressure provided to a corresponding one of the wheel cylinders and the maximum brake torque corresponding to the maximum regenerative energy generated in a corresponding one of the traction motors, the maximum regenerative energy for each of the wheels can be maintained to a maximum by controlling the hydraulic pressure provided to a corresponding one of the wheel cylinders. Since the brake torque applied to the wheel cylinders is controlled separately wheel by wheel, the maximum regenerative energy can always be obtained even when the brake torque provided to the wheels varies from wheel to wheel.

The brake apparatus according to the present invention may further comprise a hydraulic pressure providing unit providing the hydraulic pressure calculated by the hydraulic pressure calculating unit to the wheel cylinder of a corresponding wheel.

In one embodiment according to the present invention, the hydraulic pressure providing unit may comprise a hydraulic pressure control valve provided to the each wheel, the hydraulic pressure control valve generating the hydraulic pressure provided to the wheel cylinder of the corresponding wheel by decreasing a master cylinder pressure provided from a master cylinder.

The hydraulic pressure control valve may comprise a solenoid valve connected between the master cylinder and the wheel cylinder of the corresponding wheel cylinder, the solenoid valve decreasing the master cylinder pressure in proportion to a current provided thereto.

Additionally, a check valve may be connected parallel to the hydraulic pressure control valve between the master cylinder and a corresponding wheel cylinder, the check valve allowing a flow of brake fluid only in a direction from the wheel cylinder of the corresponding wheel to the master cylinder. Thus, the brake fluid can be returned to the master cylinder via the check valve, allowing a quick decrease of the pressure in the wheel cylinder.

In one embodiment of the present invention, a solenoid valve may be provided between the wheel cylinder of the corresponding wheel and a reservoir which stores and provides brake fluid to the master cylinder so as to return the brake fluid to the reservoir when the solenoid valve is open.

The hydraulic pressure control valve may be controlled based on a first hydraulic pressure measured between the master cylinder and the hydraulic pressure control valve and a second pressure measured between the hydraulic pressure control valve and a corresponding wheel cylinder. The first pressure indicates the master cylinder pressure, and the second pressure indicates the hydraulic pressure actually provided to each wheel cylinder.

Additionally, in the brake apparatus according to the present invention, the maximum regenerative energy calculating unit may calculate the maximum hydraulic pressure based on limitations determined by a rating of the traction motor, a temperature of the traction motor and a circuit for driving the traction motor, a voltage generated by a battery as a power source and a charge condition of the battery.

Other objects, features and advantages of the present invention will become more apparent from the following detailed description when read in conjunction with the accompanying drawings.

DETAILED DESCRIPTION OF THE PREFERRED EMBODIMENT

Figure 1:
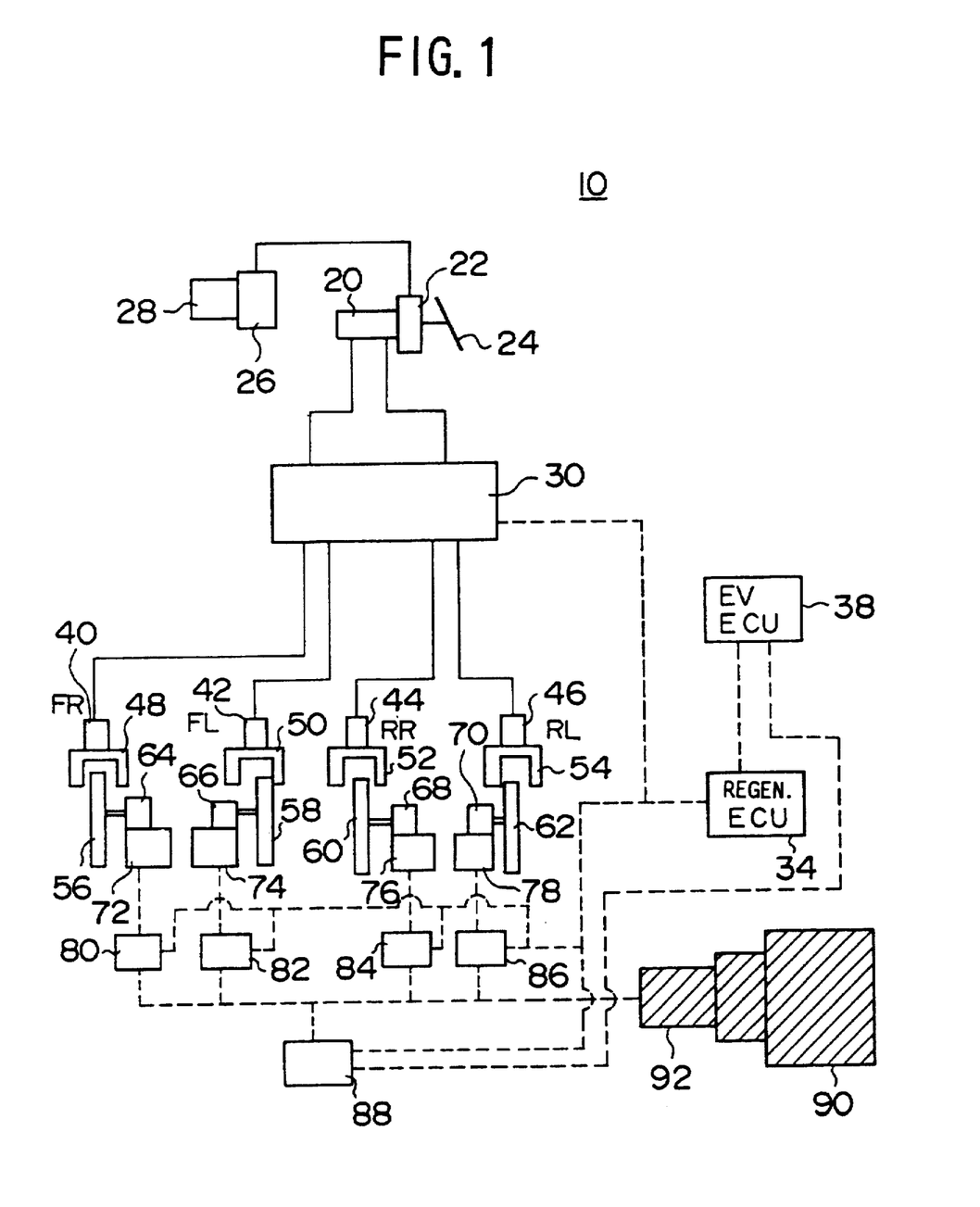
FIG. 1 is a system diagram of a brake apparatus according to an embodiment of the present invention.

A description will now be given, with reference to FIG. 1, of an embodiment of the present invention. FIG. 1 is a system diagram of a brake apparatus 10 according to the embodiment of the present invention. The brake apparatus shown in FIG. 1 is used in an electric vehicle.

The brake apparatus 10 comprises a tandem brake master cylinder 20 having two separate pressurizing chambers. The master cylinder 20 is connected to a brake pedal 24 via a vacuum booster 22. The vacuum booster 22 is connected to a vacuum pump 26 which provide a negative pressure to the vacuum booster 22. The vacuum pump 26 is driven by a motor 28. In the above-mentioned construction, a hydraulic pressure corresponding to a depression of the brake pedal 24 is generated in each of the pressurizing chambers of the master cylinder 20. The hydraulic pressure generated in the master cylinder 20 is provided to a hydraulic pressure control unit 30.

The hydraulic pressure control unit 30 provides pressure to each of wheel cylinders 40, 42, 44 and 46. The wheel cylinders 40, 42, 44 and 46 are provided to a right front wheel (FR), a left front wheel (FL), a right rear wheel (RR) and a left rear wheel (RL), respectively, so as to operate respective brake calipers 48, 50, 52 and 54. When the brake calipers 48, 50, 52 and 54 are operated, brake pads provided to the brake calipers are pressed against surfaces of respective brake rotors 56, 58, 60 and 62. Thus, a brake torque corresponding to the hydraulic pressure generated in the master cylinder 20 is applied to each of the wheels.

The wheels FR, FL, RR and RL are driven by traction motors 72, 74, 76 and 78 via gears 64, 66, 68 and 70, respectively. The traction motors 72, 74, 76 and 78 are controlled by motor control units 80, 82, 84 and 86, respectively. The motor control units 80, 82, 84 and 86 are connected to a battery 88 as a power source. As will be described later, the motor control units 80, 82, 84 and 86 have a function to charge the battery 88 by electric currents regenerated by the traction motors 72, 74, 76 and 78. The battery 88 can optionally be charged by an electric current generated by a generator 92 driven by an engine 90.

The hydraulic pressure control unit 30, the traction motor control units 80, 82, 84 and 86 and the battery 88 are connected to a regeneration electronic control unit (regeneration ECU) 34. The regeneration ECU 34 is connected to an entire vehicle electronic control unit (EVECU) 38. The regeneration ECU 34 receives information with respect to a condition of the vehicle from the EVECU 38 so a to control the brake apparatus 10 based on the information.

In the brake apparatus 10, as mentioned above, braking of the electric vehicle is performed by a combination of the hydraulic brake controlled by the hydraulic pressure control unit 30 and the regenerative brake controlled by the traction motor control units 80, 82, 84 and 86.

In the regenerative brake, a reverse electromotive force generated in each of the traction motors 72, 74, 76 and 78 is converted into the regenerative energy, that is, regenerative electric current, and the regenerative energy is supplied to the battery 88. In this regeneration process, a torque is generated in each of the traction motors 72, 74, 76 and 78. This torque can be used as a brake torque applied to each of the wheels. The brake torque generated by the regeneration is hereinafter referred to as a regenerative brake torque.

The regenerative energy can be controlled by a duty-ratio control of the on/off state of a charge circuit provided in each of the traction motor control units 80, 82, 84 and 86. The charge circuit supplies a charge current to the battery 88. Specifically, the on-time of the charge circuit is increased to increase the regenerative energy, and the off-time is increased to decrease the regenerative energy. That is, the amount of the regenerative energy is controlled by an average of the time period during which the regenerative energy is transferred to the battery. When the charge circuit is on, an amount of the regenerative energy per unit time varies in proportion to the revolution speed of the traction motor. When the charge circuit is on, a brake torque is generated in the traction motor due to consumption of the reverse electromotive force in the traction motor. On the other hand, when the charge circuit is off, no brake torque is generated in the traction motor since the reverse electromotive is not consumed. Accordingly, the amount of the regenerative torque is varied in proportion to the duration of on-time of the charge circuit. This means that the regenerative energy is proportional to a multiplication of the regenerative brake torque and the revolution speed of the traction motor.

Figure 2:
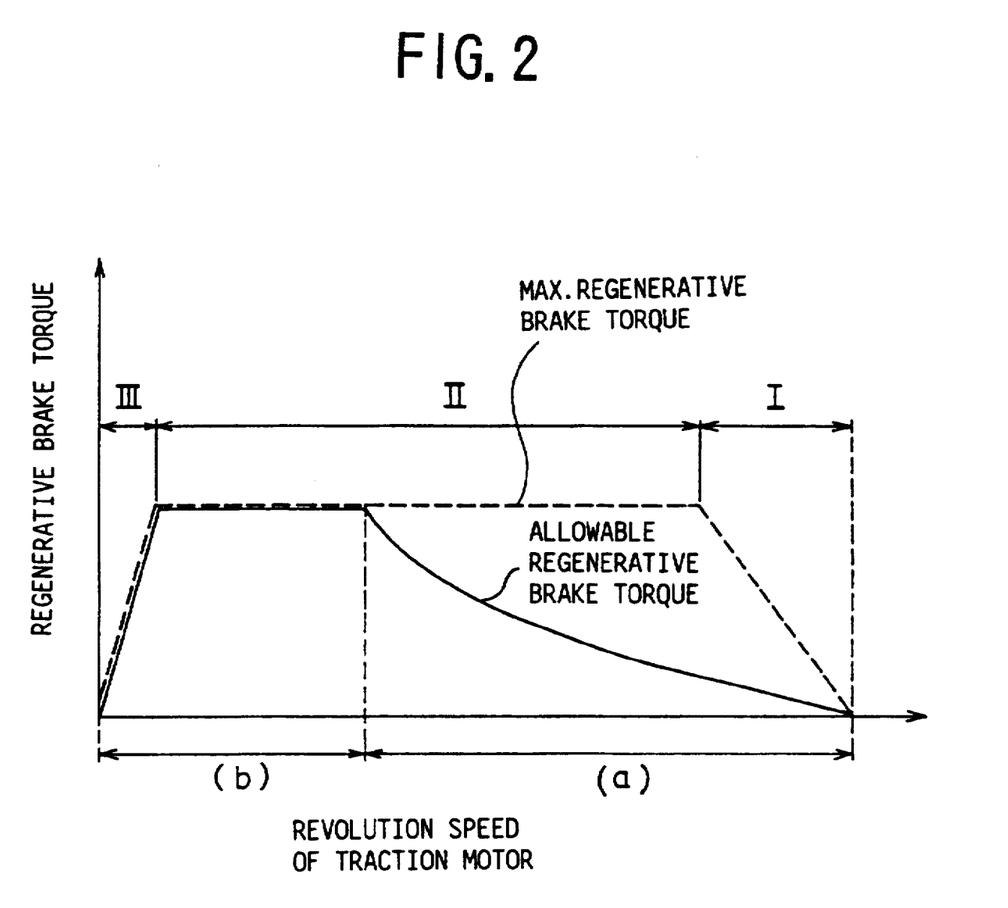
FIG. 2 is a graph showing a relationship between a regenerative brake torque and revolution speed of a traction motor.

In order to efficiently use the regenerative energy, preferably, the whole reverse electromotive force generated in the traction motor should be converted into the regenerative energy supplied to the battery 88. In such a case, the regenerative energy is at a maximum, and thus the regenerative brake torque is maximized. The regenerative brake torque obtained when the whole reverse electromotive torque is converted into the regenerative energy is hereinafter referred to as a maximum regenerative brake torque. The maximum regenerative brake torque is dependent on the revolution speed of each of the traction motors 72, 74, 76 and 78, characteristics of the traction motors, ambient temperature, etc. In the graph of FIG. 2, dashed lines indicate a relationship between the revolution speed of the traction motor and the maximum regenerative brake torque. As shown in FIG. 2, the maximum regenerative brake torque is decreased as the revolution speed is increased in the high-revolution range indicated by I. This decrease in the maximum regenerative brake torque is caused by a structural characteristic of the traction motor. In the middle range indicated by II, the maximum regenerative brake torque is maintained constant by being limited due to the rating of the traction motor. In the low-revolution range indicated by III, a reverse electromotive force is decreased, and thus the maximum regenerative brake torque is deceased as the revolution speed of the traction motor is decreased.

However, there is an allowable limit of the regenerative energy supplied to the battery 88 due the capacity of the battery 88. The allowable limit is determined by a charged condition, a voltage, an ambient temperature, etc. If the regenerative energy exceeds the allowable limit, the battery 88 may receive undesirable influence such as a decrease in the service life. Accordingly, the regenerative energy is limited below the allowable upper limit, resulting in limitation of the regenerative brake torque. The regenerative brake torque limited due to the condition of the battery 88 is hereinafter referred to as an allowable regenerative brake torque. In the graph of FIG. 2, the allowable regenerative brake torque is indicated by solid lines. As mentioned above, the regenerative energy is proportional to a multiplication of the regenerative brake torque and the revolution speed of the traction motor. Thus, the regenerative energy is increased as the revolution speed of the traction motor is increased. Accordingly, in a high-revolution range indicated by (a), the regenerative energy exceeds the allowable upper limit if the maximum regenerative brake torque is generated. In order to prevent occurrence of this condition, as shown in FIG. 2, the allowable regenerative brake torque is decreased below the maximum regenerative brake torque. On the other hand, in a low-revolution range indicated by (b), the allowable regenerative brake torque is limited by the maximum regenerative brake torque so as to be equal to the maximum regenerative brake torque.

Figure 3:
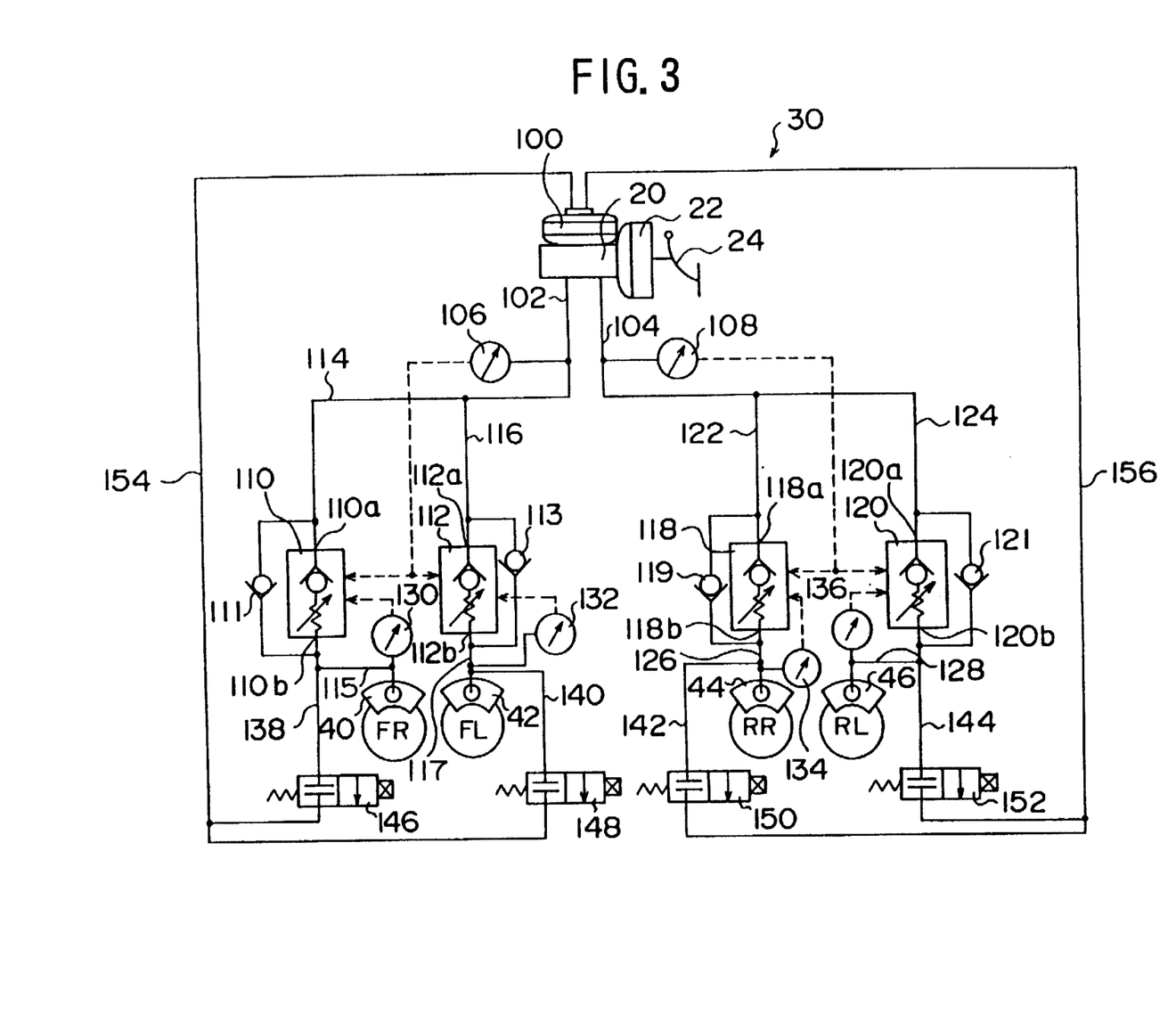
FIG. 3 is a structural diagram of a hydraulic pressure control apparatus shown in FIG. 1.

A description will now be given, with reference to FIG. 3, of a hydraulic brake operation. FIG. 3 is a structural diagram of the hydraulic pressure control apparatus 30 which controls the hydraulic brake operation. It should be noted that the hydraulic pressure control apparatus 30 shown in FIG. 3 includes the master cylinder 20, the vacuum booster 22, the brake pedal 24 and the wheel cylinders 40, 42, 44 and 46.

Master cylinder passages 102 and 104 are connected to the respective pressurizing chambers of the master cylinder 20. Pressure gauges 106 and 108 are provided to the respective master cylinder passages 102 and 104 so as to measure a pressure in each of the pressurizing chambers. The pressure gauges 106 and 108 can be replaced by sensors which can detect a depression force of the brake pedal 24 such as a depression force sensor.

The master cylinder passage 102 is branched into master cylinder passages 114 and 116. The master cylinder passage 114 is connected to a master cylinder pressure port 110a of a hydraulic pressure control valve 110, and the master cylinder passage 116 is connected to a master cylinder pressure port 112a of a hydraulic pressure control valve 112. Similarly, the master cylinder passage 104 is branched into master cylinder passages 122 and 124. The master cylinder passage 122 is connected to a master cylinder pressure port 118a of a hydraulic pressure control valve 118, and the master cylinder passage 124 is connected to a master cylinder pressure port 120a of a hydraulic pressure control valve 120. Control hydraulic pressure ports 110b, 112b, 118b and 120b are connected to the wheel cylinders 40, 42, 44 and 46 via wheel cylinder passages 115, 117, 126 and 128, respectively. Check valves 111, 113, 119 and 121 are connected between the master cylinder pressure ports 110a, 112a, 118a and 120a and the control hydraulic pressure ports 100b, 112b, 118b and 120b of the hydraulic pressure control valves 110, 112, 118 and 120, respectively. The check valves 111, 113, 119 and 121 allow hydraulic flow only in directions from the control hydraulic pressure ports 110b, 112b, 118b and 120b to the master cylinder pressure ports 110a, 112a, 118a and 120a, respectively. Pressure gauges 130, 132, 134, 136 are provided to the wheel cylinder passages 115, 117, 126 and 128, respectively. Relief passages 138, 140, 142 and 144 are branched from the respective wheel cylinder passages 115, 117, 126 and 128. The relief passages 138, 140, 142 and 144 are connected to normally open solenoid valves 146, 148, 150 and 152, respectively. The relief passages 138 and 140 are integrated into a reservoir passage 154 which is connected to the reservoir 100 after passing the solenoid valves 146 and 148, respectively. The relief passages 142 and 144 are integrated into a reservoir passage 156 which is connected to the reservoir 100 after passing the solenoid valves 150 and 152, respectively.

The hydraulic pressure control valves 110, 112, 118 and 120 outputs a hydraulic pressure from the control hydraulic pressure ports 110b, 112b, 118b and 120b by proportionally reducing a hydraulic pressure supplied to the master cylinder pressure ports 110a, 112a, 118a and 120a.

Figure 4:
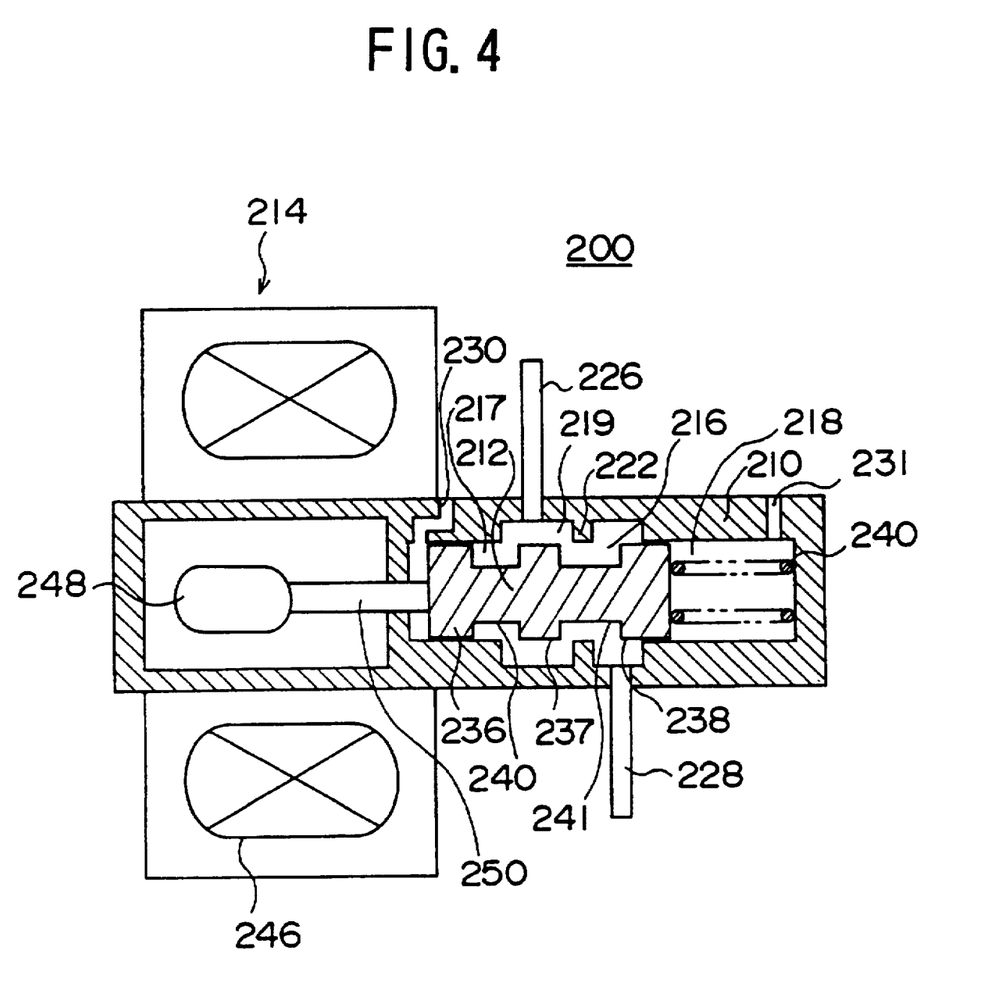
FIG. 4 is a cross-sectional view of a hydraulic pressure control valve having the same function with a hydraulic pressure control valves shown in FIG. 3.

A description will now be given, with reference to FIG. 4, of a construction of the hydraulic pressure control valves 110, 112, 118 and 120. FIG. 4 is a cross-sectional view of a hydraulic pressure control valve 200 which has the same function with the hydraulic pressure control valves 110, 112, 118 and 120.

The hydraulic pressure control valve 200 comprises a housing 210, a spool 212 and linear solenoid 214. The housing 210 is provided with a cylinder portion 216. The cylinder portion 216 includes a small diameter portion 217 on the left side, another small diameter portion 218 on the right side and a large diameter portion 219 between the small diameter portions 217 and 218. An annular protrusion 222 is formed on an inner surface of the large diameter portion 219. A master cylinder pressure port 226 is provided to a portion of the large diameter portion 219 between the annular protrusion 222 and the small diameter portion 217. Additionally, a control hydraulic pressure port 226 is provided to a portion between the annular protrusion 222 and the small diameter portion 218. A reservoir port 230 is provided at the end of the left side small diameter portion 217 and a reservoir port 231 is provided at the end of the right side small diameter portion 218.

The spool 212 is slidably provided in the cylinder portion 216. The spool 212 has a substantially cylindrical shape. The spool 212 comprises large diameter portions 236, 237 and 238 and small diameter portions 240 and 241. The small diameter portion 240 is positioned between the large diameter portions 236 and 237, and the small diameter portion 241 is positioned between the large diameter portions 237 and 238. The large diameter portion 236 of the spool 212 slides within the small diameter portion 217 of the cylinder portion 216. The large diameter portion 237 of the spool 212 sealingly slides on an inner surface of the small diameter portion 217 of the cylinder portion 216. The large diameter portion 238 of the spool 212 sealingly slides on an inner surface of the small diameter portion 218 of the cylinder portion 216. The large diameter portion 237 of the spool 212 also sealingly slides on an inner surface of the annular protrusion 222. A spring 240 is provided between the spool 212 and the right side end of the cylinder portion 216 so that the spring 240 urges the spool 212 in the leftward direction in FIG. 4.

The linear solenoid 214 is provided to the left side of the housing 210. The linear solenoid 214 moves a plunger 248 by a force generated by a coil 246 in the rightward direction in FIG. 4. The force exerted on the plunger 248 corresponds to a current flowing to the coil 246. The force exerted on the plunger 248 is transmitted to the spool 212. Thus, the spool 212 is pressed rightwardly in FIG. 4 against the force exerted by the spring 240.

When a current flows to the coil 246 and the spool 212 is pressed by the plunger 248 in the rightward direction, the spool 212 is moved rightwardly, and the large diameter portion 237 of the spool 212 engages with the annular protrusion 222 of the cylinder portion 216. In this state, the connection between the master cylinder pressure port 226 and the control hydraulic pressure port 228 is interrupted. This state defines a fully closed state of the hydraulic pressure control valve 200. When the current flowing to the coil 246 is gradually decreased from this state, the spool 212 is moved leftwardly and the large diameter portion 237 of the spool 212 separates from the annular protrusion 222. This allows a connection between the master cylinder pressure port 226 and the control hydraulic pressure port 238. The degree of connection between the master cylinder pressure port 226 and the control hydraulic pressure port 238 is increased as the spool 212 moves leftwardly. When no current is provided to the coil 246, the spool 212 reaches the rightmost position in the cylinder portion 216, and a hydraulic pressure input from the master cylinder pressure port 226 is directly output to the control hydraulic pressure port 238. Accordingly, the hydraulic pressure output from the control hydraulic pressure port 118 can be controlled by moving the spool 212 by varying the current flowing to the coil 246. In other words, in the hydraulic pressure control valve 200, the hydraulic pressure input to the master cylinder pressure port 226 is changed in proportion to the rate of change of the current flowing to the coil 246, and the changed hydraulic pressure is output from the control hydraulic pressure port 228.

When the construction of the hydraulic pressure control valve 200 is applied to the hydraulic pressure control valves 110, 112, 118 and 120 shown in FIG. 3, the master cylinder pressure port 226 corresponds to the master cylinder pressure ports 110a, 112a, 118a and 120a and the control hydraulic pressure port 228 corresponds to the control hydraulic pressure ports 110b, 112b, 118b and 120b. It should be noted that each of the hydraulic pressure control valves 110, 112, 118 and 120 has reservoir ports corresponding to the reservoir ports 230 and 231 of the hydraulic pressure control valve 200 although these ports and connections thereof to the reservoir 100 are not shown in FIG. 3. The current flowing to the coil of the hydraulic pressure control valve is hereinafter simply referred to as a valve drive current.

Returning FIG. 3, an operation of the hydraulic pressure control apparatus 30 is described. The above-mentioned hydraulic pressure control valves 110, 112, 118 and 120, solenoid valves 146, 148, 150 and 152 and the pressure gauges 106, 108, 130, 132, 134 and 136 are connected to the regenerative ECU shown in FIG. 1. The regenerative ECU 34 sends instructions to these valves based on the measurement of the pressure gauges so as to control the hydraulic pressure brake torque during a brake control process.

In order to increase a pressure in the wheel cylinder 40 of the right front wheel (FR), a solenoid of the solenoid valve 146 is maintained to be in a non-activated state and the valve drive current provided to the hydraulic pressure control valve 110 is controlled so that the pressure in the wheel cylinder 40 becomes equal to a target value. The pressure in the wheel cylinder 40 can be maintained to be equal to the target value by controlling the valve drive current so that the hydraulic pressure control valve 110 is fully opened.

In order to decrease the pressure in the wheel cylinder 40, the solenoid of the solenoid valve 146 is activated and the valve drive current provided to the hydraulic pressure control valve 110 is controlled so that the valve drive current to the hydraulic pressure valve 110 causes the hydraulic pressure control valve to be fully opened. By this operation, brake fluid in the wheel cylinder flows to the reservoir 100, and the pressure in the wheel cylinder 40 is decreased. At this time, if the pressure in the master cylinder 20 is less than the pressure in the wheel cylinder 40, the brake fluid in the wheel cylinder 40 flows also to the master cylinder 20 via the check valve 111. Thereby, the pressure in the wheel cylinder 40 is quickly decreased. The solenoid of the solenoid valve 146 is switched to the non-activated state when the pressure in the wheel cylinder 40 measured by the pressure gauge 130 is decreased to a target value. Thereby, the pressure in the wheel cylinder 40 is maintained to be equal to the target value.

The hydraulic pressure in the wheel cylinders 42, 44 and 46 of the left front wheel (FL), the right rear wheel (RR) and the left rear wheel (RL) can be increased and decreased, similar to the control of the pressure in the wheel cylinder 40, by controlling operations of the hydraulic pressure control valves 112, 118 and 120 and the solenoid valves 148, 150 and 152. As shown in FIG. 3, the hydraulic pressure control valves 110, 112, 118 and 120 and the solenoid valves 146, 148, 150 and 152 are provided to the four wheels, respectively. Thus, a hydraulic pressure brake torque applied to each of the wheels can be independently controlled according to the hydraulic pressure control valve 30.

It should be noted that, in the hydraulic pressure control unit 30, the pressure in the master cylinder is directly provided to the wheel cylinders 40, 42, 44 and 46 by providing no current to all the hydraulic pressure control valves 110, 112, 118 and 120 and the solenoid valves 146, 148, 150 and 152. Accordingly, with the hydraulic pressure control unit 30, the brake torque is positively provided to each of the wheels, when the apparatus in malfunctioning, by stopping the current to all of the valves as mentioned above. This improves a fail safe operation of the brake apparatus 10 of the electric vehicle.

In the brake apparatus 10 of the electric vehicle, a brake torque for each of the wheels is controlled by an appropriate combination of the above-mentioned regenerative brake and the hydraulic pressure brake. Such a control of the brake torque can be achieved by the regenerative ECU 34 performing a brake control routine shown in FIG. 5.

Figure 5:
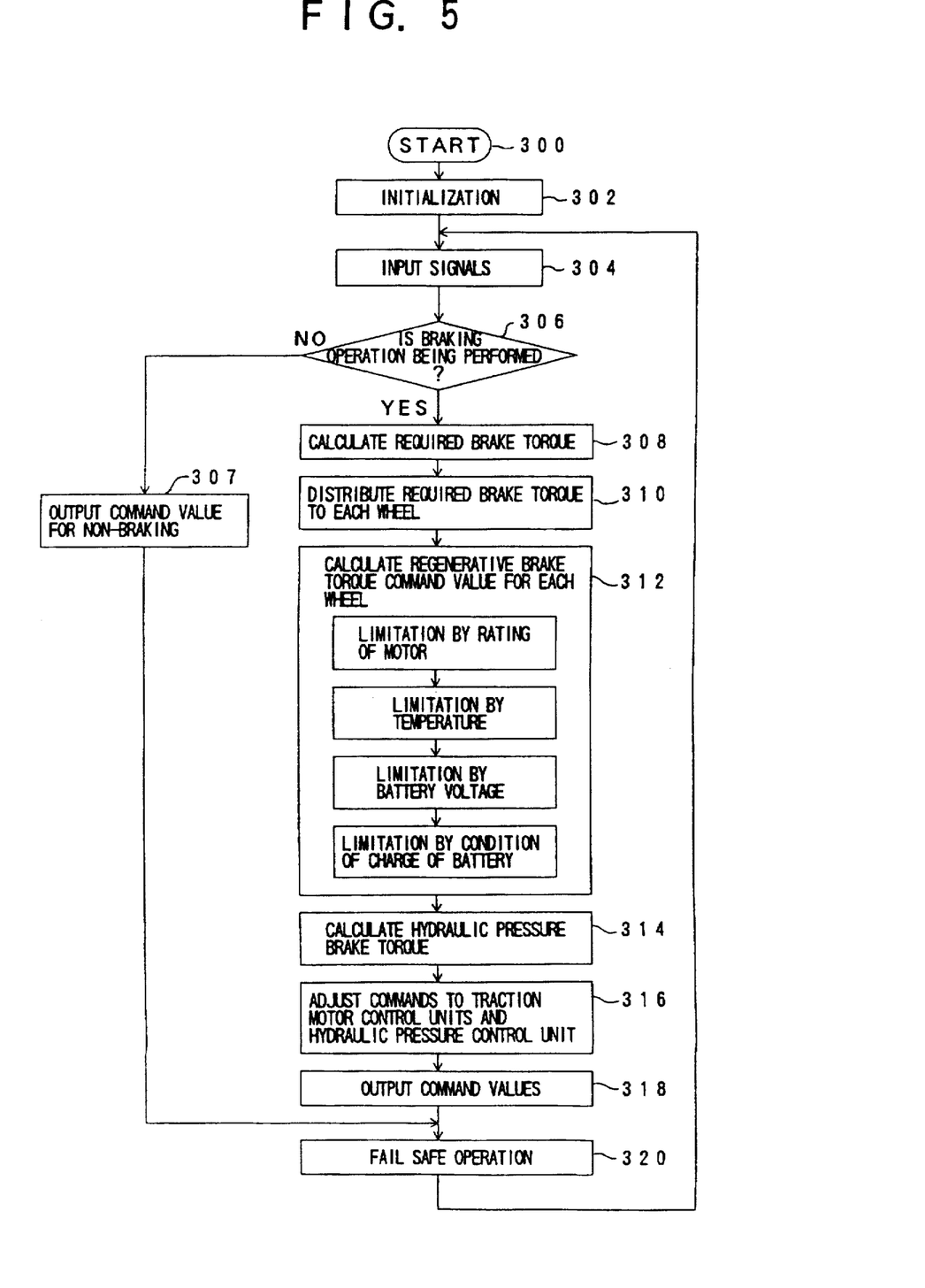
FIG. 5 is a flowchart of a brake control routine performed by a regenerative electronic control unit shown in FIG. 1.

FIG. 5 is a flowchart of the brake control routine performed by the regenerative ECU 34. The brake control routine is started when the operation of the vehicle is started. In step 302, the an initialization of the brake apparatus is performed. Then, in step 304, signals used in the regenerative brake control are input. The signals input in step 304 include an output signal of a brake switch, output signal of the pressure gauges 106, 108, 130, 132, 134 and 136, voltage signal of the battery 88, a signal indicating a condition of the battery 88, a signal indicating a steering wheel angle, a signal indicating an acceleration in a transverse direction, signals indicating temperatures of the traction motors 40, 42, 44 and 46, a signal indicating a temperature of the battery 88, a regenerative brake torque command value and a hydraulic pressure brake torque command value from the previous process.

After the process of step 304 is completed, the routine proceeds to step 306. It is determined, in step 306, whether or not a braking operation is being performed. If it is determined that the braking operation is being performed, it is determined that a brake control is not needed, and the routine proceeds to step 307. In step 307, the valve drive current provided to each of the hydraulic pressure control valves 110, 112, 118 and 120 is set to zero. Additionally, in step 307, the solenoid of each of the solenoid valves 146, 148, 150 and 152 is set to the non-activated state, and the routine proceeds to step 320.

If it is determined, in step 306, that the brake operation is being performed, the routine proceeds to step 308. In step 308, a required brake torque for the vehicle is calculated based on master cylinder pressure signals output by the pressure gauges 106 and 108. Thereafter, the routine proceeds to step 310.

In step 310, a brake torque to be provided to each of the wheels is calculated. This calculation is made to distribute the required brake torque to each of the wheels based on a load applied to each of the wheels, the steering angle signal and the transverse acceleration signal. For example, when the load to each of the wheels is different from each other due to unevenness of passenger's weight and/or loaded weight, the brake torque for the wheel having a larger load is increased, and vice versa. Additionally, load to the outer side wheels is increased when the vehicle is moving in a curve. Thus, when it is determined that the vehicle is moving in a curve based on the steering angle signal and/or the transverse acceleration signal, the brake torque to the outer side wheels is increased and the brake torque to the inner side is decreased. By appropriately distributing the required brake torque to each of the wheels in the above-mentioned manner, a stable brake operation of the vehicle can be achieved. After the process of step 310 is completed, the routine proceeds to step 312.

In step 312, a calculation is made for a regenerative brake torque command value for each of the wheels. As mentioned above, the maximum allowable regenerative brake torque for each of the wheels is limited by the revolution speed of the traction motor. The maximum allowable regenerative brake torque is also limited by a rating and a temperature of the traction motor and the motor control circuit. Additionally, the maximum allowable regenerative brake torque is limited by a voltage and a charge condition of the battery. Accordingly, in step 312, the regenerative brake torque for each of the wheels is calculated based on these limitations. After the process of step 312 is completed, the routine proceeds to step 314.

In step 314, the hydraulic pressure brake torque is calculated for each of the wheels. The calculation is made by subtracting the regenerative brake torque calculated in step 312 from the required brake torque for each of the wheels calculated in step 310. That is, a target value of a master cylinder pressure which generates a brake torque corresponding to the difference between the required brake torque and the regenerative brake torque is calculated so as to compensate for the shortage of the required brake torque by the regenerative brake torque. After the process of step 314 is completed, the routine proceeds to step 316.

In step 316, the values of the regenerative brake torque and the hydraulic brake torque calculated in steps 312 and 314 are compared with the values obtained in the process of the last routine so as to calculate the differences therebetween. Additionally, in step 316, the command values to the traction motor control units 80, 82, 84 and 86 and the hydraulic pressure control unit 30 are adjusted based on the calculated differences. Then, in step 318, the command values are sent to the traction motor control units 80, 82, 84 and 86 and the hydraulic pressure control unit 30.

After the process of step 318 is completed, a fail safe process is performed in step 320. In the fail safe process, it is determined whether or not a malfunction is occurring in the hydraulic pressure control unit 30. If it is determined that a malfunction is occurring, the currents supplied to the hydraulic pressure control valves 110, 112, 118 and 120 and the solenoid valves 146, 148, 150 and 152 are stopped so that the master cylinder pressure is directly provided to the wheel cylinders 40, 42, 44 and 46.

After the process of step 320 is completed, the routine returns to step 304 so as to repeat steps 304 to step 320 while the vehicle is being operated.

As mentioned above, according to the hydraulic pressure control unit 30 and the brake control routine according to the present embodiment, the brake torque applied to each of the wheels is independently controlled based on the difference between the required brake torque and the regenerative brake torque for each of the wheels. Thus, when the required brake torque is different from wheel to wheel, the required brake torque is provided to each of the wheels while the regenerative brake torque for each of the wheels is maintained to be equal to the maximum allowable regenerative brake torque by adjusting the hydraulic brake torque for each of the wheels in response to the difference between the required brake torque and the maximum allowable brake torque. Accordingly, the required brake torque is provided to each of the wheels while the regenerative energy is maintained to be a maximum. That is, in the brake apparatus 10 according to the present embodiment, the regenerative energy can be maximized when the brake torque required by each of the wheels is different from each other.

The present invention is not limited to the specifically disclosed embodiments, and variations and modifications may be made without departing from the scope of the present invention.

What is claimed is:

1. A brake apparatus for an electric vehicle which includes a plurality of wheels and a plurality of, wherein a hydraulic pressure brake and a regenerative brake is associated with each wheel, each regenerative brake being associated with a respective one of a corresponding plurality of traction motors, wherein each hydraulic pressure brake generates a brake torque by providing a hydraulic pressure to a wheel cylinder of the corresponding wheel of the vehicle and each regenerative brake generates a brake torque by regeneration in the respective traction motor, the brake apparatus comprising:

- a torque calculating unit which calculates a total brake torque to be provided to each wheel based on a braking action of a driver of the vehicle;
- a maximum regenerative energy calculating unit calculating, for each wheel, a maximum regenerative energy to be generated by the respective traction motor; and
- a hydraulic pressure calculating unit calculating, for each wheel, a hydraulic pressure to be provided to the corresponding wheel cylinder based on the total brake torque and the calculated maximum regenerative energy so that an amount of regenerative energy generated by each of the respective traction motors equals the maximum regenerative energy calculated for the wheel associated with the respective traction motor.

2. The brake apparatus as claimed in claim 1, further comprising a hydraulic pressure providing unit providing the hydraulic pressure calculated for each wheel to the corresponding wheel cylinder.

3. The brake apparatus as claimed in claim 2, wherein the hydraulic pressure providing unit comprises a hydraulic pressure control valve provided for each wheel, each hydraulic pressure control valve generating the hydraulic pressure provided to the wheel cylinder of the corresponding wheel by decreasing a master cylinder pressure provided from a master cylinder.

4. The brake apparatus as claimed in claim 3, wherein each hydraulic pressure control valve comprises a solenoid valve connected between the master cylinder and the corresponding wheel cylinder, each solenoid valve decreasing the master cylinder pressure in proportion to a current provided thereto.

5. The brake apparatus as claimed in claim 3, further comprising a check valve connected in parallel to each hydraulic pressure control valve between the master cylinder and the corresponding wheel cylinder, each check valve allowing a flow of brake fluid only in a direction from the corresponding wheel cylinder to the master cylinder.

6. The brake apparatus as claimed in claim 3, wherein a solenoid valve is provided between each wheel cylinder and a reservoir storing and providing brake fluid to the master cylinder so as to return the brake fluid to the reservoir when the solenoid valve is open.

7. The brake apparatus as claimed in claim 3, wherein each hydraulic pressure control valve is controlled based on a first hydraulic pressure measured between the master cylinder and the hydraulic pressure control valve and a second pressure measured between the hydraulic pressure control valve and the corresponding wheel cylinder.

8. The brake apparatus as claimed in claim 3, wherein the maximum regenerative energy calculating unit calculates the maximum regenerative energy based on a rating of the traction motor, a temperature of the traction motor and a circuit for driving the traction motor, a voltage generated by a battery as a power source and a charge condition of the battery.

* * * * *

UNITED STATES PATENT AND TRADEMARK OFFICE
CERTIFICATE OF CORRECTION

PATENT NO. : 5,895,100
DATED : April 20, 1999
INVENTOR(S) : Masashi ITO, et al.

It is certified that error appears in the above-indentified patent and that said Letters Patent is hereby corrected as shown below:

Column 3, line 59, delete "with a" and insert --as the--.

Column 5, line 42, after "due" insert --to--.

Column 9, line 8, change "in" to --is--.

Column 9, line 21, delete "the" before "an".

Column 11, line 9, after "plurality of" insert --wheel cylinders--.

Signed and Sealed this

Twenty-third Day of May, 2000

Attest:

Q. TODD DICKINSON

*Attesting Officer*      *Director of Patents and Trademarks*